Oct. 30, 1956

L. A. SAYCE 2,768,393

METHOD OF CUTTING A FINE SCREW THREAD TO
FUNCTION AS A LEAD SCREW IN PRODUCING
ANOTHER FINE SCREW THREAD

Filed May 9, 1952

INVENTOR
LEONARD ALFRED SAYCE

BY *Lawson and Taylor*
ATTORNEY

INVENTOR
LEONARD ALFRED SAYCE

ATTORNEY

Oct. 30, 1956  L. A. SAYCE  2,768,393
METHOD OF CUTTING A FINE SCREW THREAD TO
FUNCTION AS A LEAD SCREW IN PRODUCING
ANOTHER FINE SCREW THREAD
Filed May 9, 1952  3 Sheets-Sheet 3

*INVENTOR*
LEONARD ALFRED SAYCE

BY  *Lawson and Taylor*
ATTORNEY

United States Patent Office 2,768,393
Patented Oct. 30, 1956

2,768,393

METHOD OF CUTTING A FINE SCREW THREAD TO FUNCTION AS A LEAD SCREW IN PRODUCING ANOTHER FINE SCREW THREAD

Leonard Alfred Sayce, Hampton Hill, England, assignor to National Research Development Corporation, London, England, a British corporation Application May 9, 1952, Serial No. 286,892

6 Claims. (Cl. 10—1)

This invention relates to the production of helical rulings or the like, involving screw thread cutting or scribing operation on the surface of a cylinder. While the invention is especially applicable for the formation of helical diffraction gratings it may be applied also to sundry purposes where it is desired to avail of the relative axial motion caused by relative rotation of a nut-forming means and a co-operating screw.

In connection with nut and screw assemblies used for the transmission of motion it has already been proposed to provide a nut-forming component the thread portion of which is formed of a soft resilient or elastic material, such as cork, rubber, fibre, leather, balsa wood or the like, the elasticity of which is sufficient to ensure that whilst relative rotation of the screw and nut components can take place with comparative freedom an intimate contact is maintained between the interengaging threads of the components during such rotation, whereby when the elastic thread pertaining to the nut component is thus in engagement with a sufficient plurality of turns of the male screw thread (i. e. extending over a range of at least one complete cycle of a periodic error) and the relative rotation occurs, such imperfections as periodic errors in the original formation of the male screw thread are averaged out owing to the elasticity of the elastic thread so that irregularities in the resulting axial motion due to such errors are minimised.

Motion transmitting mechanism of the above-mentioned character has already been disclosed by patent application Ser. No. 198,078, now Patent No. 2,702,393, issued February 22, 1955, according to which a suitable construction of nut-forming component, lined with a resilient or elastic material such as above referred to, has been arranged as a follower restrained from rotation as the male screw is rotated, this follower having means for supporting and conveying therewith a tool for impressing or cutting upon an unthreaded part of the male screw component a ruling or helix derived from the axial movement imparted to the nut-forming component.

For convenience of description, a nut-forming component having its thread portion formed of a resilient elastic material as referred to above, will be termed a "resilient nut."

Now, an initial lathe-cut screw thread is liable to possess not only periodic errors which repeat themselves at regular intervals, but also progressive and non-periodic errors resulting from gradual and non-cyclic changes of pitch throughout the length of lead screw of the lathe. Whilst the resilient nut has been found to minimise the effects of periodic errors, this form of nut does not of itself eliminate or correct for errors of the above-mentioned progressive and non-periodic character.

It is an object of the present invention to provide for the utilisation of a resilient nut in such a way that in the course of the relative axial motion brought about between it and a screw-like member with which it co-operates the motion is rendered substantially free from both periodic errors and progressive (non-periodic) errors.

With the foregoing object in view the invention according to one aspect resides in forming a screw thread on a cylinder, with which thread a resilient nut is adapted to co-operate to produce relative axial motion of the cylinder and nut over a given range, wherein the screw thread is formed as a composite thread by applying to the cylinder surface a multiplicity of closely spaced individual cutting elements so as to engage and cut or inscribe over a given axial extent of the surface a plurality of separate short lengths of screw thread, the relative traverse of each of said elements and the cylinder amounting to only a small fractional part of the given range of axial motion of the cylinder and nut, whereby owing to the small extent of said traverse the incidence of progressive error is minimised.

The invention may be carried out in a variety of ways, rendered possible by reason of the property of a resilient nut to be able to accept guidance from a number of separate short lengths of screw thread all out of phase with one another. Thus, although the arrangement is fundamentally susceptible of employing as the multiplicity of spaced individual cutting elements a number of closely spaced cutting tools, moved in unison, where the pitch is comparatively coarse, in the case where the pitch is of a fine order such as that suitable for diffraction gratings it is proposed that the individual cutting elements be furnished by the application of an abrasive material, such as abrasive stone, abrasive coated paper or the like, traversed by means of the lead screw of a lathe. Alternatively, these cutting elements may be applied in the form of abrasive particles suspended in a liquid medium such as oil.

To facilitate the understanding of the invention, reference is now directed to the following description taken in conjunction with the accompanying drawings, whereof:

Figure 1:
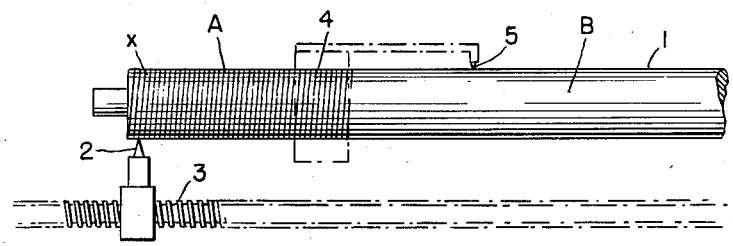
Fig. 1 represents schematically, by way of comparison with the invention, the formation of a screw thread upon part of the surface of a cylinder with the aid of merely a single cutting tool which is operated by means of a lathe lead-screw.

Referring firstly to Fig. 1, let it be assumed that upon one half A of a rotatably mounted polished metal cylinder 1 a fine screw thread $x$ is cut with the aid of a single cutting tool 2 operated by means of a lathe lead screw 3, the thread $x$ being arranged to be subsequently copied upon the other half B of the cylinder by the agency of a resilient nut 4 carrying rigidly therewith a cutting tool 5. Assume also that the initial uncorrected lathe-cut thread $x$ consists of one continuous helix measuring 6 inches in length. In cutting the thread $x$ a length of 6 inches of the lead-screw 3 is employed for the guidance of the cutting tool 2. In this length of 6 inches of lead-screw there will inevitably be certain gradual changes of pitch, or so-called progressive errors, which will be imposed upon the helix $x$ cut by the tool 2 and these progressive errors will, in turn, be imposed upon the corrected thread when produced by the tool 5 acting on the half B of the cylinder in response to axial travel of the nut 4.

Figure 2:
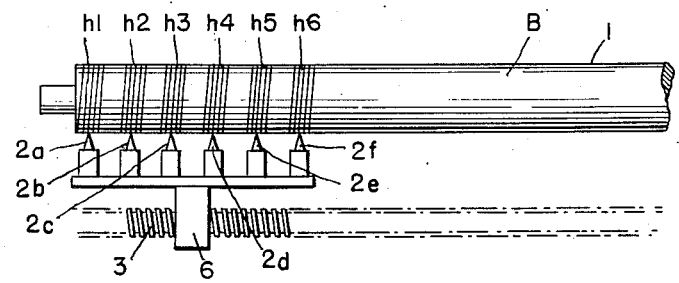
Fig. 2 illustrates schematically, in contrast to Fig. 1, the underlying principle of the invention, employing a plurality of cutting tools.

Suppose, however, that the lathe screw 3 serves to operate a holder 6 as indicated in Fig. 2 wherein the holder is furnished with six cutting tools 2a, 2b, 2c, 2d, 2e and 2f (instead of a single tool 2 as in Fig. 1) and that these six tools be spaced at intervals of one inch. If now the lathe screw 3 be operated, six helices $h1$, $h2$, $h3$, $h4$, $h5$ and $h6$ will be cut simultaneously and in a one-inch traverse of the holder 6 (using only one-inch of lead screw 3) a composite helix (composed of the helices $h1$ to $h6$) six inches in length will be produced on the cylinder 1. Similarly, if the tool-holder of the lathe were furnished with 600 cutting tools spaced at intervals of $\frac{1}{100}$ inch, a traverse of $\frac{1}{100}$ inch, employing only $\frac{1}{100}$ inch of lead screw, would suffice to produce a length of 6 inches of composite helix. By allowing a resilient nut, as at 4 in Fig. 1, to traverse this six inch length of composite helix it will move in a manner free from both periodic and progressive error and a stylus attached to it can be made to scribe an error-free helix upon the other half B of the cylinder.

Figure 3:
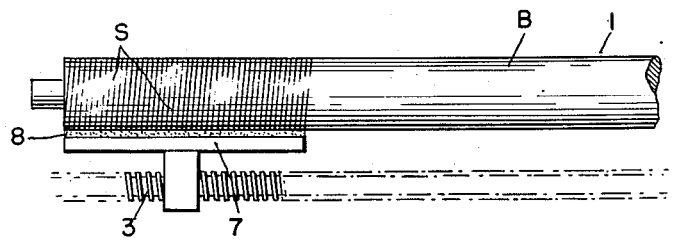
Fig. 3 is a view, similar to Fig. 2, wherein the cutting elements are furnished by means of an abrasive material.

As it might prove impracticable to arrange fro the uniform spacing of a large number of independent cutting tools, such as further tools similar to the tools 2a to 2f (Fig. 2), the invention, according to a further feature thereof, resides also in an arrangement as indicated in Fig. 3 wherein a holder 7, operated from the lathe screw 3, carries a length, say six inches, of abrasive material 8 so as to be applied to, say, a six inch length of the cylinder 1. The abrasive material 8 may be of any suitable kind. It may be formed, say, as a six-inch strip of abrasive stone, abrasive coated paper or other abrasive-impregnated material in such a way as to scratch the cylinder 1 with a plurality of scratches S each of which has a helix angle appropriate to the pitch of the required corrected helix that may be ultimately formed at the region B of the cylinder as a result of applying a resilient nut, with cutting tool, to the region which bears the scratches S. In this way only a small traverse of the abrasive material 8 is required and this traverse may be obtained by the conventional lathe lead-screw, as indicated in Fig. 3, or other means such as a suitably driven inclined plane or cam might be employed for effecting such traverse.

Figure 4:
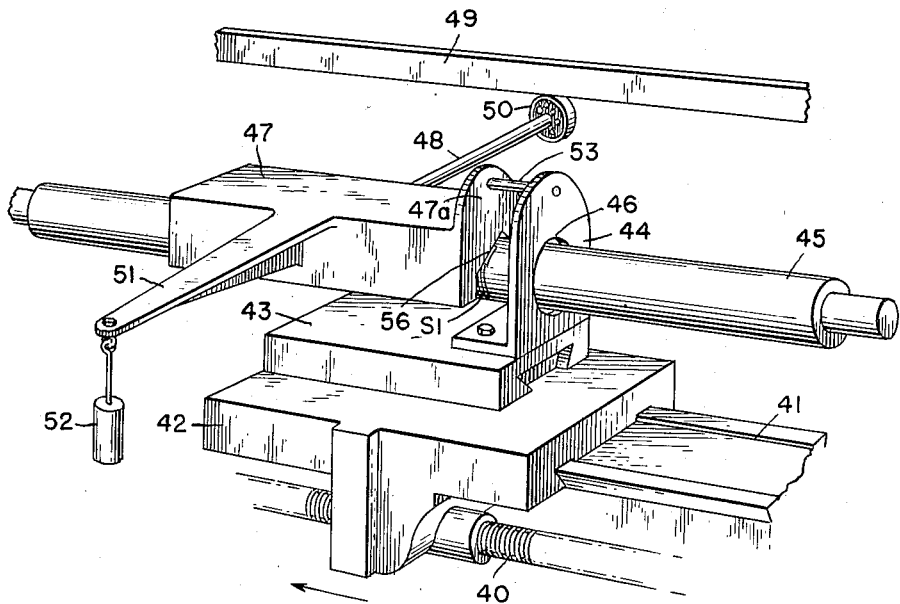
Fig. 4 shows in perspective the relevant parts of a preferred form of arrangement serving for carrying out the invention by way of example.
Figure 5:
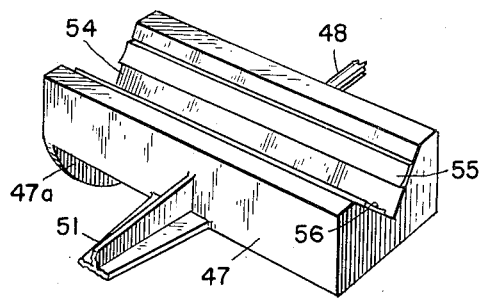
Fig. 5 illustrates, in inverted position, further detail of one of the components shown in Fig. 4; whilst

In the arrangement shown in Fig. 4, which lends itself especially for use in the production of diffraction gratings resulting from the formation of very fine helices, namely helices having a pitch, say, of the order of many hundreds, or thousands of threads to the inch, a conventional lathe lead-screw 40 associated with a lathe bed 41 is arranged to operate a slide 42 on which is carried a base 43 for an upstanding bracket 44, the members 42, 43 and 44 being thereby capable of axial movement in unison in response to rotation of the threaded lead-screw 40. Suitably mounted in the lathe (by means not shown) is a metal cylinder 45 on which it is desired to form a composite thread from which there can be derived at another part of the cylinder a corrected thread substantially free from progressive and periodic errors. For the formation of the composite thread, indicated at S1, the bracket 44 is apertured at 46 to allow of its freely encircling the cylinder 45 whilst moving axially. Over the region of the cylinder 45 where the composite thread S1 is to be formed there is mounted a lap body 47, preferably of metal such as brass, reposing by its own weight upon the cylinder 45 and being restrained from rotation by means of an arm 48 extending therefrom and engaging at its outer end with the underside of a fixed guiding rail 49 through the intermediary of a roller 50. An arm 51 carrying a counterweight 52 extends from the body 47 in a direction opposed to that of the arm 48, thus maintaining the body in seated position on the cylinder 45 whilst permitting the body to be moved axially. Axial movement of the body 47 in response to rotation of the lead-screw 40 is imparted by means of a pin 53 extending from the bracket 44 and having its free end arranged to bear against a projecting part 47a of the body, it being understood that as the members 42, 43 and 44 are moved in unison in the direction of the arrow shown in Fig. 4 upon appropriate rotation of the lead screw 40 the pin 53 will correspondingly urge the body 47 axially along the cylinder 45 in the same direction. As shown in Fig. 5, the underside of the body is formed with a V-shaped channel 54 along the opposite sides of which are applied, as for example by means of an adhesive, a pair of strips 55, 56 of abrasive coated paper adapted to bear upon the surface of the cylinder 45 when the body 47 is mounted as shown in Fig. 4. It will be understood, therefore, that by means of the abrasive particles of the strips 55, 56 engaging the cylinder 45 a small axial traverse of these strips in response to rotation of the lead screw 40 will result in the production of a composite thread S1 on the cylinder 45, which composite thread may serve as a primary thread from which, by the application of a resilient nut, a secondary thread substantially free from both periodic and progressive errors may be formed at another part of the cylinder.

Figure 6:
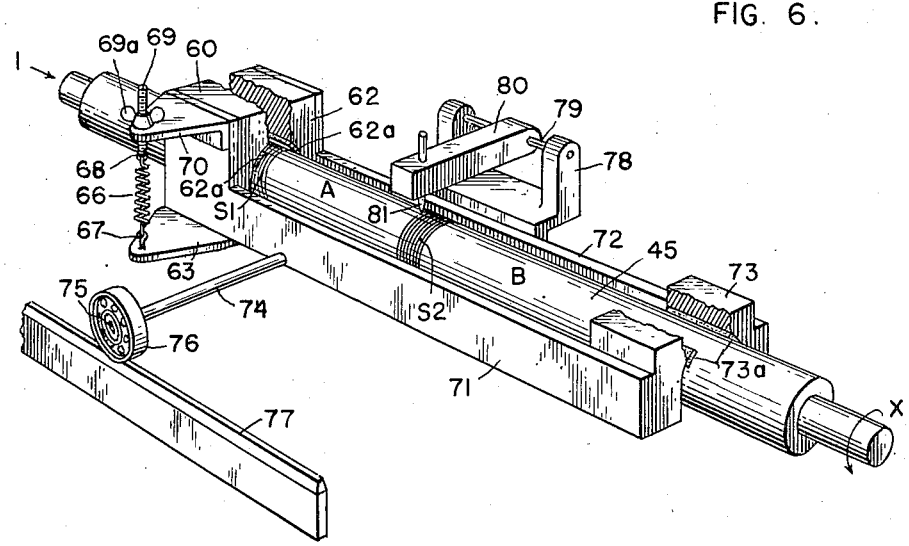
Fig. 6 is a perspective view showing a mode of finally producing a corrected thread with the aid of a resilient nut, Fig. 7 being an end view taken in the direction of the straight arrow I in Fig. 6.
Figure 7:
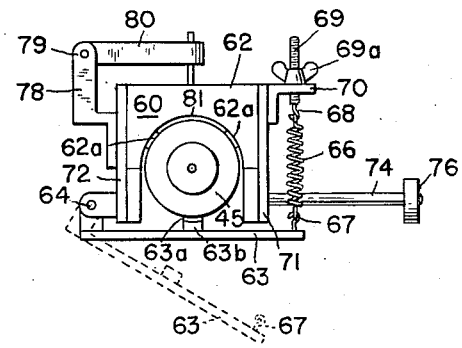

For the formation of a corrected thread from the composite thread on the cylinder 45 the latter may be set up according to the arrangement shown in Figs. 6 and 7. Thus, the cylinder 45 with the composite thread S1 thereon is mounted for co-operation with a nut-forming component denoted generally by the numeral 60. The component 60 comprises an upper metal jaw member 62 and a lower metal jaw member 63, the jaw member 62 being saddle shaped as shown and the jaw member 63 being of a flat plate construction which is pivotally connected to the upper jaw member 62 by means of a hinge 64. Spaced apart at substantially 120° on the underside of the arch that is formed by the saddle shaped jaw member 62 there are adhesively secured, as by means of ordinary sealing wax, a pair of thin strip-like inserts 62a consisting of cork. A similar cork insert 63a is secured to a projecting part 63b on the upper surface of the lower jaw member 63 at a position such that when the jaw member 63 occupies the position shown in full lines in Figure 7 the insert 63a is disposed at 120° with respect to each of the inserts 62a. The jaw members 62 and 63 are adapted to be clamped over the composite thread portion S1 of the cylinder 45 in such a way as to cause the inner exposed surfaces of the inserts 62a and 63a to engage with a plurality of the scratches forming the composite thread S1. In applying the jaw members 62 and 63 to the cylinder 45 the lower member 63 can be swung about the hinge 64 so that it is free to assume a position as suggested in dotted outline in Figure 2 whereby after the jaw member 62 has been placed in position over the cylinder 45 the jaw member 63 is raised so as to cause the insert 63a to bear against the underside of the mandrel cylinder 45. The jaw member 63 is held in the raised position by means of a tensioning spring 66 the lower end of which engages with a hook 67 on the jaw member 63, whilst the upper end of the spring 66 is anchored to a hook 68 carried by a screw 69 which passes through a lug 70 on the jaw member 62. By appropriate rotation of a wing nut 69a which is mounted on the screw 69 and is adapted to bear against the upper side of the lug 70, the screw 69 can be raised or lowered so as to regulate, through the tension of the spring 66 the clamping pressure exerted by the jaw members 62 and 63. Prior to the application of clamping pressure, the surface of the cork inserts 62a and 63a which are all of the same character, is substantially smooth, but when the clamping pressure is applied the surface of the inserts 62a and 63a becomes impressed by and conforms to the threads S1 of the cylinder 45, thus forming a resilient nut.

The jaw member 62 forms part of a frame structure composed of spaced apart longitudinal frame members 71, 72 which at an end remote from the jaw member itself are bridged by a saddle piece 73 which is arched so as to fit over a further part of the cylinder 45. The saddle piece 73 which carries on its underside a pair of pad members 73a of smooth antifriction material consisting for example of strips of polytetrafluorethylene serves, when in the position illustrated, to maintain alignment of the nut-forming component 60 as a whole, without affecting any axial movement thereof. The component 60 in addition to comprising a unitary assembly of the jaw members 62 and 63, the frame members 71, 72 and the saddle piece 73, carries an outrigger attachment consisting of an arm 74 extending laterally from the frame member 71 the outer end of the arm 74 being provided with a bearing 75 supporting a wheel 76 adapted to bear against a flat surfaced stationary track 77, so that the component 1 can be restrained from rotation whilst being capable of moving axially, i. e. longitudinally with respect to the cylinder 45.

Rigidly attached to the frame member 72 is an upstanding bifurcated bracket 78 in which is pivotally mounted at 79 one end of a tool holding arm 80, the other end of the arm 80 having a cutting tool 81, such as a stylus or diamond type cutter, mounted therein so as to bear against the cylinder 45.

With the resilient nut component 60 mounted in the operative position on the cylinder 45 as shown in Figures 6 and 7, that is to say with the jaw members 62 and 63 tensioned by the spring 66 sufficiently to cause the inserts 62a and 63a to develop a thread formation intimately in contact with the composite thread S1 the component 60 is in a condition to function as an axially movable follower in response to rotation of the cylinder 45. Thus by rotating the cylinder 45 and therewith the threads S1, in the sense indicated by the arrow X, the threads S1, acting as a lead-screw, impart to the component 1 a longitudinal movement towards the left as viewed in Figure 6. Thereupon the tool 81 is caused to inscribe or cut threads S2 at the region B of the cylinder 45. These threads S2 however, form a corrected reproduction of the threads S1 owing to the elasticity of the thread portions of the inserts 62a and 63a pertaining to the nut-forming component 1, the threads S2 furthermore being substantially free from both periodic and progressive errors owing to the way in which the initial composite thread S1 has been formed.

As hereinbefore indicated, the invention may be carried out in various ways. Thus, a strip of abrasive stone, abrasive coated paper or the like can be applied to the cylinder so as to form the multiplicity of short separate lengths of screw thread as a result of imparting a substantially uniform longitudinal motion to the cylinder by means of progressive action thereon of a movable inclined plane or cam having an inclination appropriate to the pitch of the required corrected helix, it being understood that a resilient nut will thereafter be applied to the screw thread thus formed on the cylinder. Any suitable means such for example as a gear-train associated with the rotation of the cylinder and driving a micrometer screw, may be employed for imparting the desired uniform movement to the inclined plane or cam.

I claim:

1. A method of obtaining uniform transmission of motion in the form of relative axial motion caused by relative rotation of a nut-forming means and a cooperating screw, capable of being applied for the production of helical rulings or the like, which comprises forming upon the surface of a cylinder a fine screw thread, with which screw thread a thread-forming portion of elastic resilient material constituting the cooperating part of said nut-forming means is adapted to cooperate to produce relative axial motion of the cylinder and nut over a given range, said fine screw thread being formed as a composite thread by the steps which comprise applying to the cylinder surface a multiplicity of closely spaced individual cutting elements consisting of abrasive particles of an abrasive material, rotating said cylinder, and transversing said cutting elements whilst in engagement with said cylinder surface so as to cut or inscribe over a given axial extent of the surface a plurality of separate short lengths of fine screw thread, the relative traverse of each of said elements and the cylinder amounting to only a small fractional part of the given range of relative axial motion of the cylinder and nut, said fractional part being less than the axial length of said elastic thread forming portion, whereby owing to the small extent of said traverse and the resiliency of said resilient nut forming means the incidence of progressive error is minimized.

2. A method as set forth in claim 1, comprising the step of traversing the cutting elements whilst in engagement with said cylinder surface under the action of a uniformly rotating lead-screw.

3. A method of obtaining uniform transmission of motion in the form of relative axial motion over a given range caused by relative rotation of a nut-forming means and a cooperating screw, capable of being applied for the production of helical rulings or the like which are substantially free from both periodic and progressive errors, which comprises forming said fine screw thread as set forth in claim 1, applying to said fine thread a nut-forming means comprising a thread-engaging portion of elastic resilient material brought into engagement with said composite fine thread, over an axial length of said cylinder greater than the length of said short traverse and causing relative rotation of said cylinder and said nut-forming means whereby the relative axial motion produced between said cylinder and said nut-forming means is substantially free from both periodic and progressive errors.

4. A method as set forth in claim 3, which comprises causing the nut-forming means to actuate a cutting or scribing tool associated therewith for producing upon a part of the cylinder other than that upon which the fine composite thread is formed a thread which is substantially free from both periodic and progressive errors.

5. A method as set forth in claim 3, wherein the rate of rotation and traverse of grinding member is so related to produce threads having a pitch of the order of many hundreds or thousands of threads to the inch.

6. A method as set forth in claim 3 in which the cylinder is rotated through a single turn.

References Cited in the file of this patent

UNITED STATES PATENTS

| | | |
|---|---|---|
| 293,930 | Woerd | Feb. 19, 1884 |
| 1,086,806 | Collins | Feb. 22, 1914 |
| 1,494,464 | Cressey | May 20, 1924 |
| 1,656,592 | Merrifield | Jan. 17, 1928 |
| 1,999,816 | Lindenmuth et al. | Apr. 30, 1935 |
| 2,302,105 | Connor | Nov. 17, 1942 |
| 2,367,562 | Braun | Jan. 16, 1945 |
| 2,702,393 | Merton | Feb. 22, 1955 |

OTHER REFERENCES

Royal Society of London—Proceedings; Series A, vol. 201, pages 187–191, March 22, 1950; Science Lib. Pat. Off.